May 26, 1936.   H. HOLLERITH, JR   2,041,713
METHOD OF AND APPARATUS FOR MANIPULATING ARTICLES,
SUCH AS TALKING MACHINE OR PHONOGRAPH RECORDS
Filed May 23, 1929   9 Sheets-Sheet 3

INVENTOR
Herman Hollerith, Jr.,
BY Lyman D. Oberlin
his ATTORNEY

May 26, 1936.  H. HOLLERITH, JR  2,041,713
METHOD OF AND APPARATUS FOR MANIPULATING ARTICLES,
SUCH AS TALKING MACHINE OR PHONOGRAPH RECORDS
Filed May 23, 1929  9 Sheets-Sheet 4
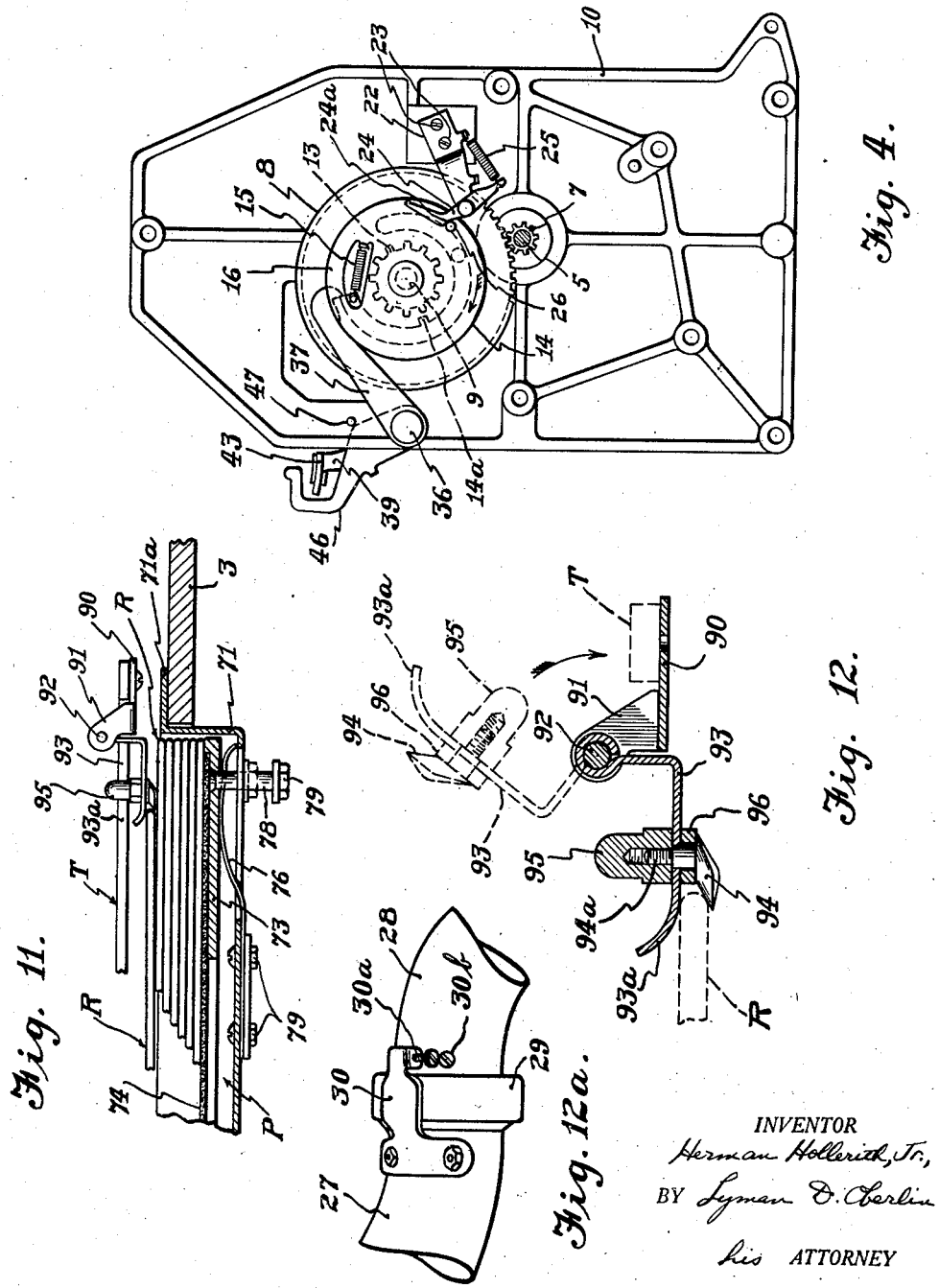

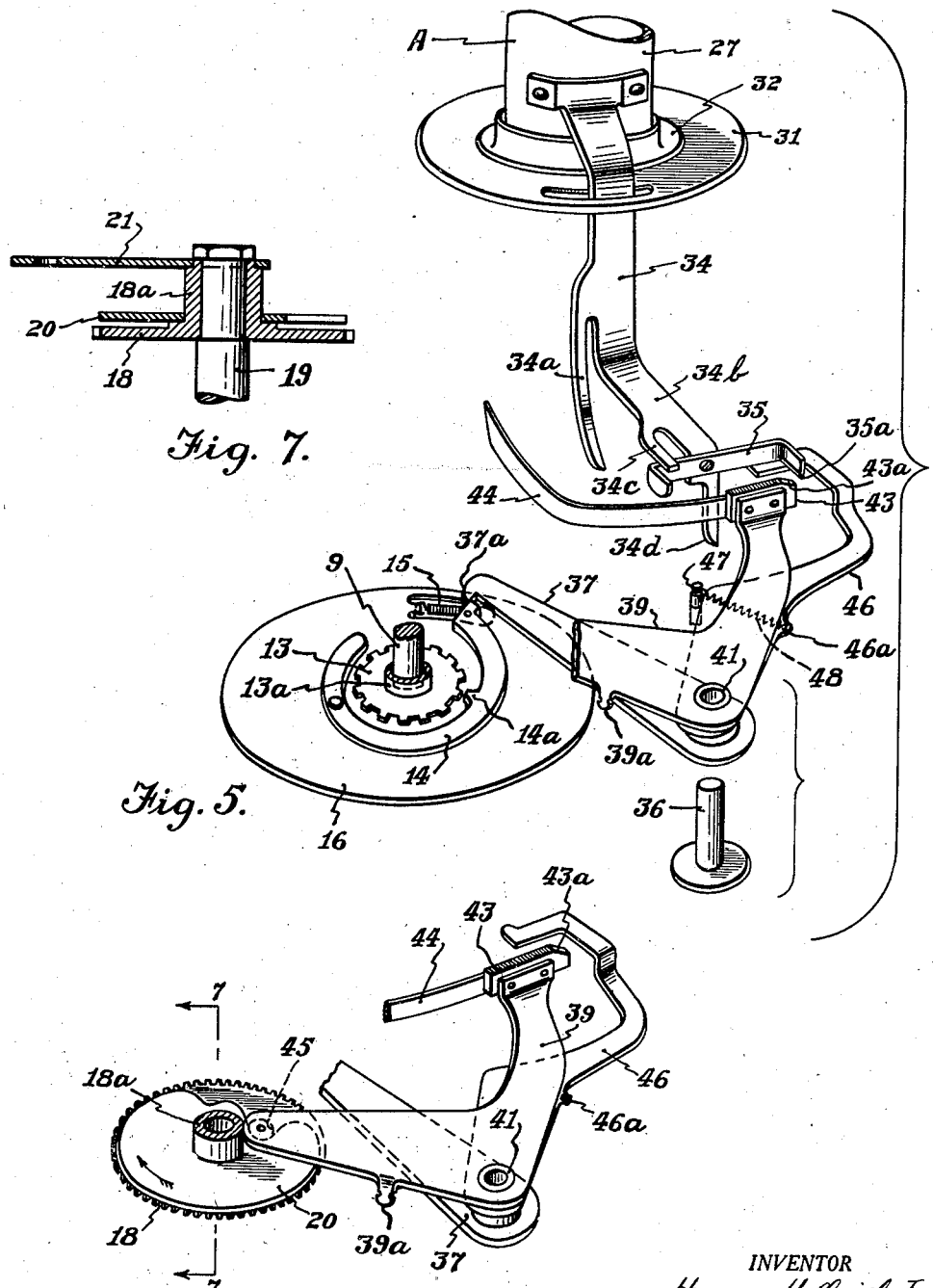

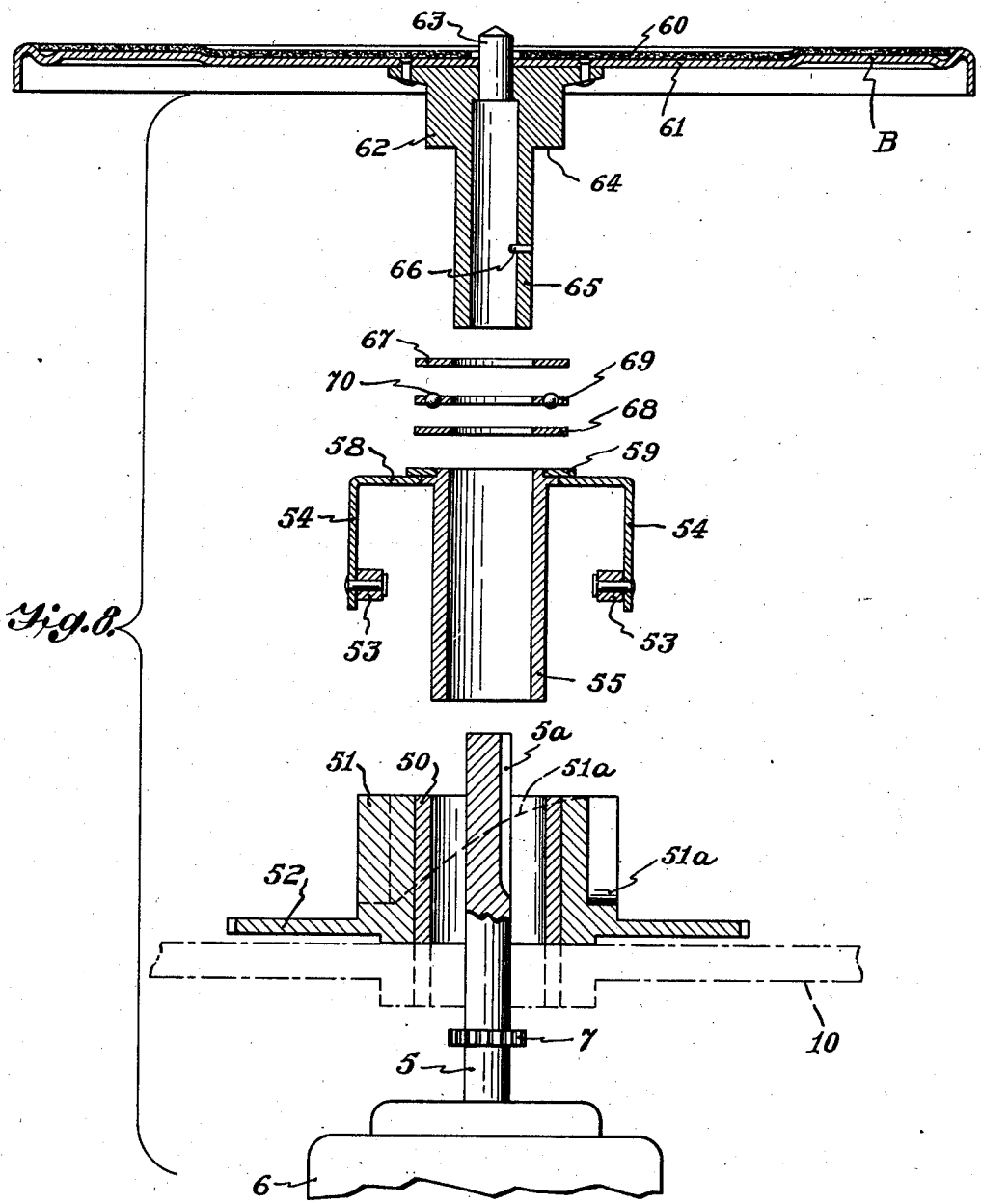

May 26, 1936.    H. HOLLERITH, JR    2,041,713
METHOD OF AND APPARATUS FOR MANIPULATING ARTICLES,
SUCH AS TALKING MACHINE OR PHONOGRAPH RECORDS
Filed May 23, 1929    9 Sheets-Sheet 7

INVENTOR
Herman Hollerith, Jr.,
BY Lyman D. Oberlin
his ATTORNEY

May 26, 1936.   H. HOLLERITH, JR   2,041,713
METHOD OF AND APPARATUS FOR MANIPULATING ARTICLES,
SUCH AS TALKING MACHINE OR PHONOGRAPH RECORDS
Filed May 23, 1929    9 Sheets-Sheet 8

INVENTOR.
Herman Hollerith, Jr.,
BY Lyman D. Oberlin
his ATTORNEY.

May 26, 1936.  H. HOLLERITH, JR  2,041,713
METHOD OF AND APPARATUS FOR MANIPULATING ARTICLES,
SUCH AS TALKING MACHINE OR PHONOGRAPH RECORDS
Filed May 23, 1929  9 Sheets-Sheet 9

INVENTOR.
Herman Hollerith, Jr.,
BY Lyman D. Oberlin
his ATTORNEY.

Patented May 26, 1936

2,041,713

UNITED STATES PATENT OFFICE 2,041,713

METHOD OF AND APPARATUS FOR MANIPULATING ARTICLES, SUCH AS TALKING MACHINE OR PHONOGRAPH RECORDS

Herman Hollerith, Jr., Riverton, N. J., assignor, by mesne assignments, to Radio Corporation of America, New York, N. Y., a corporation of Delaware Application May 23, 1929, Serial No. 365,253

18 Claims. (Cl. 274—10)

My invention relates to a method of and apparatus for manipulating talking machine or phonograph records, such as centrally perforated disk records of a type well known to the art; my invention also embraces the manipulation of disks other than talking machine or phonograph records, said last named disks being utilizable for any desired purpose, control or otherwise.

In accordance with my invention, records, as aforesaid, are transported along a path and thereafter each record, while horizontally disposed, is moved transversely of said path and into a position for coaction with a sound reproducing instrumentality, such as the needle or stylus of a sound box, pick-up device, or equivalent, said records being transported along said path from a stack of records contacting and supported one with and by another, from a record supporting structure, or otherwise as may be suitable or desirable.

It is characteristic of my invention that a record, as aforesaid, while horizontally disposed on a turntable, is elevated into coacting relation with a sound reproducing instrumentality, the latter thereupon being moved in one direction laterally of said record and into coacting relation with its spiral sound reproducing groove to effect the reproduction of sound, after which said instrumentality is moved in a direction substantially the reverse of said one direction, a given point on said instrumentality, during movement of the latter in both of said directions, traversing substantially only a horizontal plane.

It is further characteristic of my invention, in the organization last described, that records, as aforesaid, are transported in succession into the path of said turntable along a path leading from a supporting structure on which said records are disposed in superposed or side-by-side relation.

It is also characteristic of my invention, in the organization described above, that records are discharged from said turntable in succession preferably under the influence of energy derived from the rotary motion of said records as imposed by said turntable.

My invention resides in the method, apparatus, system, arrangement and features of construction of the character hereinafter described and claimed.

For an understanding of my method and for an illustration of some of the forms my apparatus or system may take, reference is to be had to the accompanying drawings in which:

Fig. 4 is a plan view of the bottom of a supporting plate or member and the mechanism associated therewith.

Figs. 5 and 6 are perspective views of automatic control mechanism.

Fig. 7, in part, is a vertical sectional view of part of the mechanism shown in Fig. 6.

Fig. 8 is a vertical sectional view, partly in elevation, of the turntable supporting and control mechanism.

Figure 9:
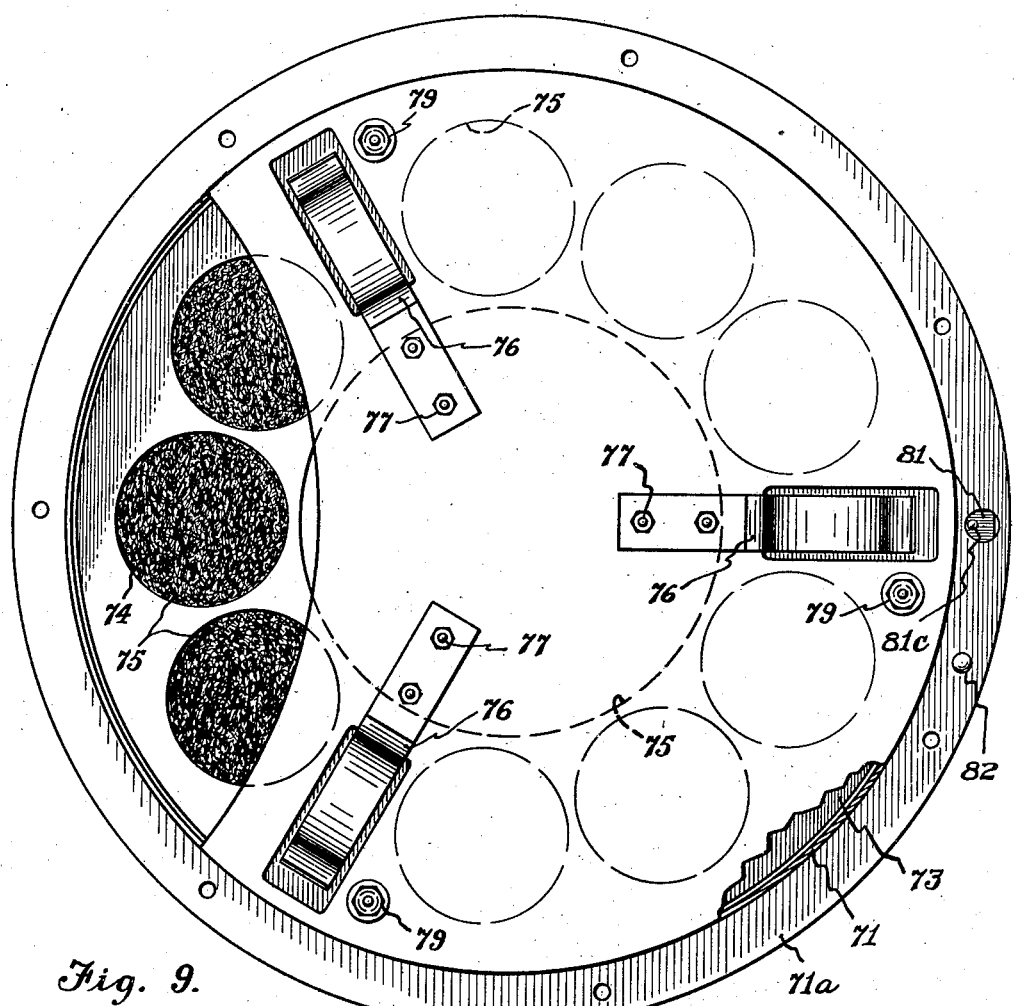

Fig. 9 is a plan view, partly broken away, of the bottom of a record-receiving receptacle.

Figure 10:
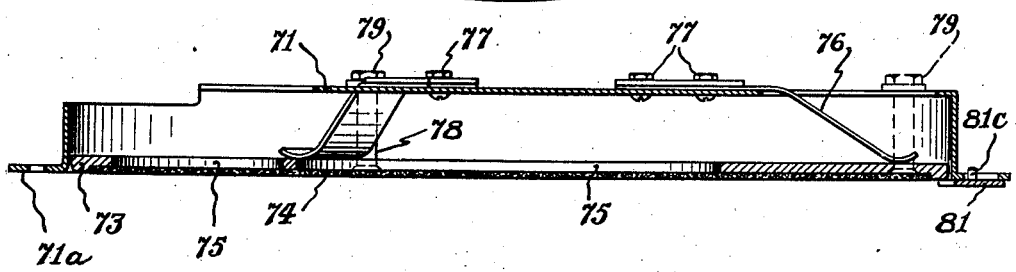

Fig. 10 is a vertical sectional view of the receptacle illustrated in Fig. 9.

Fig. 11 is a fragmentary vertical sectional view, partly in elevation, of the record-receiving receptacle and the record-translating member associated therewith.

Fig. 12 is an enlarged vertical sectional view of a record-removing and -transporting member.

Fig. 12a is a bottom plan view of a part of the tone arm, or equivalent.

Figures 13, 14:
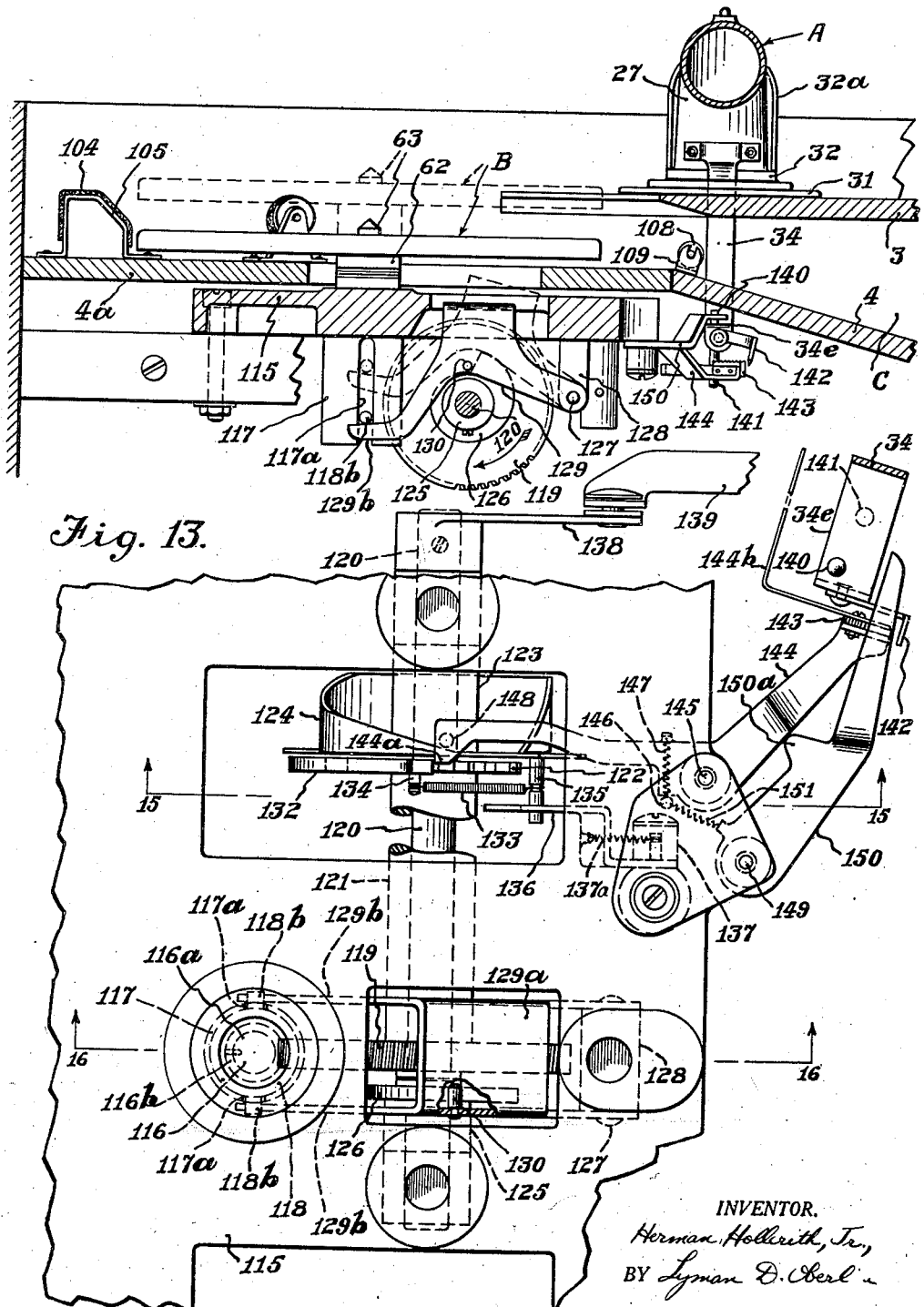

Fig. 13 is a vertical sectional view, partly in elevation, of another form of turntable supporting and control mechanism.

Fig. 14 is a plan view of a part of the mechanism shown in Fig. 13.

Figure 15:
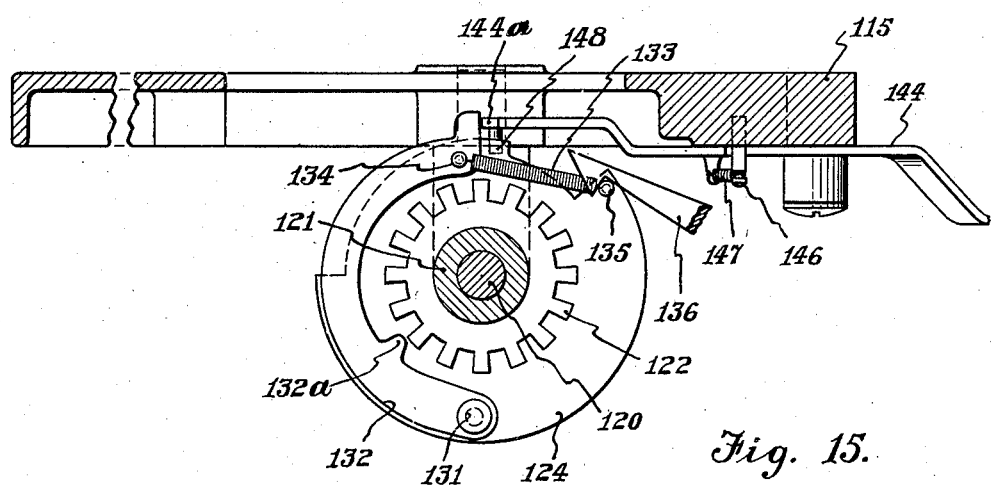

Fig. 15 is a vertical sectional view, partly in elevation, taken on the line 15—15 of Fig. 14.

Figure 16:
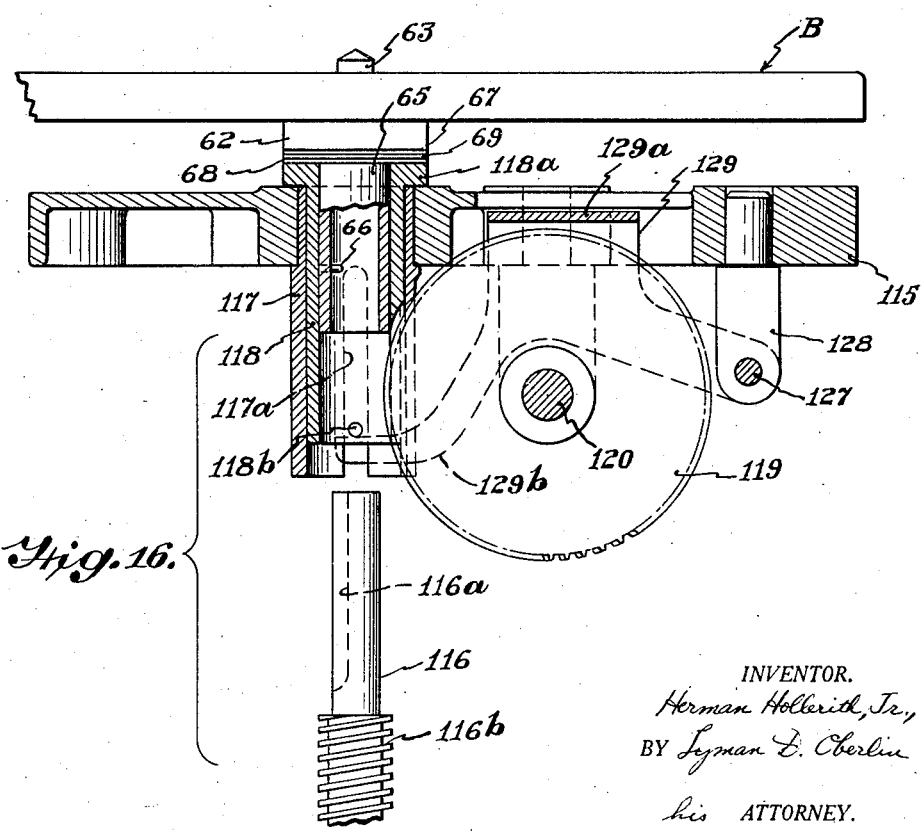

Fig. 16 is a vertical sectional view, partly in elevation, taken on the line 16—16 of Fig. 14.

Figure 1:
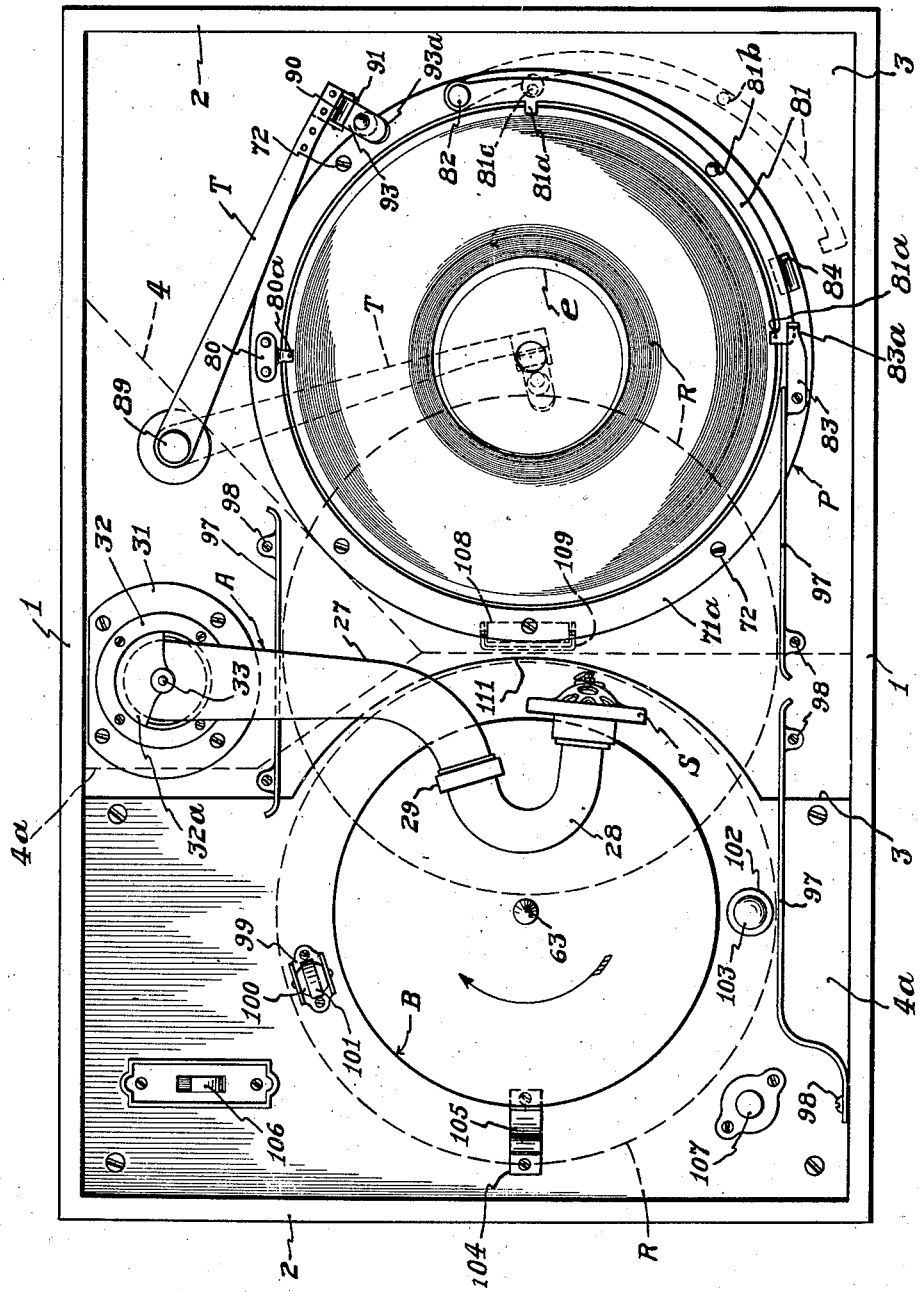
Figure 1 is a plan view of one form of talking machine or phonograph mechanism or apparatus as constructed in accordance with my invention.
Figure 2:
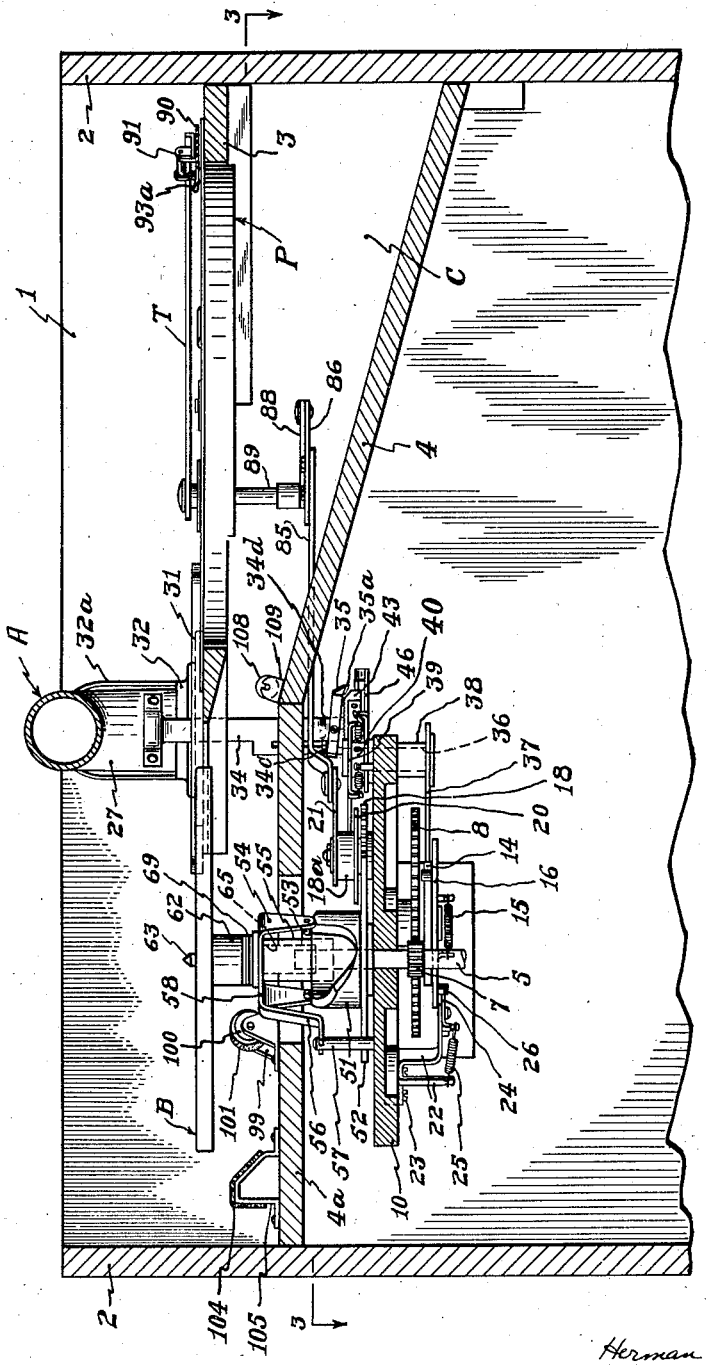
Fig. 2 is a vertical sectional view, partly in elevation, of the apparatus shown in Fig. 1.
Figure 3:
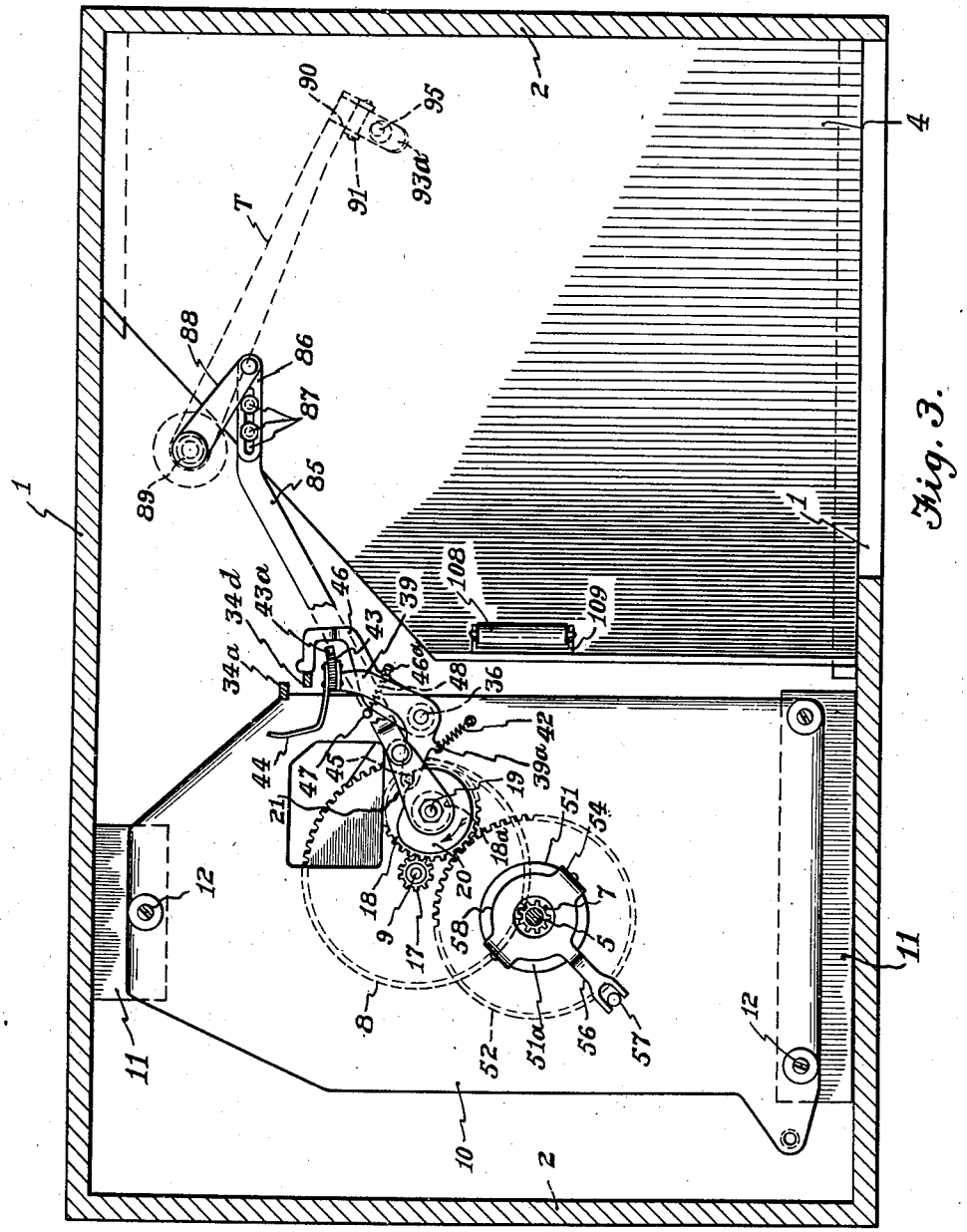
Fig. 3 is a horizontal sectional view, partly in plan, taken on the line 3—3 of Fig. 2 and looking in the direction of the arrows.

Referring to Figs. 1, 2 and 3, there is illustrated a casing or housing comprising, in the example shown, front and rear walls 1, 1 and side walls 2, 2, all of said walls being vertically disposed on a suitable base, not shown. Extending horizontally within the aforesaid casing is a shelf or ledge 3 forming a support for a record magazine P in which, as illustrated in Fig. 11, is supported a group or stack of talking machine or phonograph disk records R. The shelf 3 also supports a movable or pivoted record-translating member T and a swinging or oscillatable tone arm A. Disposed adjacent the tone arm A is a turntable B disposed in a horizontal plane and to which individual records R are transported and from which they are individually discharged, as hereinafter fully described, into a compartment or receptacle C, Fig. 2, the bottom of which is defined by a sloping wall 4 extending transversely of the aforesaid casing.

Extending longitudinally of and within the aforesaid casing is a drive shaft 5 receiving power from any suitable source which, in the example illustrated, is an electric motor 6, Fig. 8. Keyed to the shaft 5 is a gear 7 meshing with and driving a gear 8, Fig. 3, freely rotatable on a shaft 9.

Shaft 9 is journaled in a plate or member 10, Fig. 3, extending transversely of the aforesaid casing and secured, in the example shown, to projections 11, extending from the front and rear casing walls 1, 1, by screws 12, or the like, Fig. 3.

Referring to Fig. 5, a clutch wheel or spider 13 is secured by a hub 13a to the aforesaid gear 8 and, therefore, rotates with the latter. Coacting with the clutch spider 13 is a clutch cresent 14 pivoted to a disk 16 and having a tooth 14a. The tooth 14a of clutch crescent 14 is suitably biased toward the clutch spider 13 as, for example, by a helical spring 15 connected to said clutch crescent 14 and to the disk 16, Figs. 2 and 5. The disk 16 is fixed or keyed to the shaft 9 and, therefore, when the tooth 14a moves into the space between adjacent teeth of the clutch spider 13, said disk 16 and its thereto-connected shaft 9 are caused to rotate under the influence of the drive shaft 5 and the meshed gears 7 and 8.

Secured to the shaft 9 and rotatable therewith is a gear 17, Fig. 3, meshing with and driving a gear 18 rotatable on a shaft 19 upstanding from the plate 10. The gear 18 comprises a hub portion 18a receiving a cam 20 for rotation therewith, Figs. 6 and 7. Referring to Figs. 2, 3 and 7, the aforesaid hub portion 18a is shown as having a crank arm 21 secured thereto for movement therewith.

Referring to Fig. 4, the plate 10 is shown as having a bracket 22 secured thereto by screws 23, or the like. Pivoted to the bracket 22 is a lever 24 biased in a counter-clockwise direction, Fig. 4, by a helical spring 25, or the like. Lever 24 comprises a shoulder 24a adapted to be engaged periodically by a lug or member 26 projecting from the disk 16.

Referring to Fig. 1, the tone arm A is shown as comprising the usual conduits 27 and 28 to be traversed by sound waves, a connection 29 affording oscillatory movement of the conduit 28 with respect to the conduit 27. As illustrated in Fig. 12a, the conduit 27 carries a bracket 30 having adjustably mounted thereon a stop member 30a which coacts with a stop member 30b projecting from the conduit 28. The conduit 28, at its free end, carries a sound reproducing instrumentality, as a sound box S of any desired construction which comprises a diaphragm connected to a stylus bar, the latter terminating in the usual needle or stylus for coaction with one of the records R.

In accordance with my invention, the end of the conduit 27, adjacent the connection 28, is restrained for oscillatory motion only in a horizontal plane and, to this end, any desirable type of construction may be utilized. As illustrated, the shelf 3 carries a mounting plate 31, in turn, supporting a second plate or member 32, said plates 31 and 32 and said shelf 3 having alined openings through which extends the end of the tone arm section or conduit 27 supported for oscillatory movement by a perforated member, not shown, but depending from the shelf 3 and by which said conduit 27 is placed in communication with a sound amplifying horn, not shown. The member 32 comprises an upstanding part or section 32a, Figs. 1 and 2, partly surrounding the vertical portion of the tone arm section or conduit 27 and having at its end a vertically extending pin 33 received in a bearing, not shown, on the tone arm section 27. By virtue of this arrangement, the end of the conduit 27, adjacent the connection 29, may move only in a substantially horizontal plane, that is, in a direction substantially parallel with respect to the turntable B.

Carried by and movable with the conduit 27 of tone arm A is an arm or member 34, Figs. 2 and 5, which, in the example shown, comprises a substantially vertically extending member 34a, and a substantially horizontal section 34b terminating in a substantially horizontal finger 34c and a substantially vertical finger 34d. Pivoted to the arm 34, preferably on its finger 34d, is a pawl 35, one end of which is suitably biased toward the finger 34c and the other end of which comprises an edged surface 35a.

Extending through the plate 10 is a member or shaft 36, Figs. 2 and 5, to which, below the plate 10, a clutch-actuating lever 37 is secured and which is spaced from the plate 10 by a washer 38. Above the plate 10, the lever 37 has a pawl-actuated lever 39 secured thereto, the latter being spaced from said plate 10 by a washer 40. The levers 37 and 39 are tied or coupled together so as to be incapable of movement independently of each other and, accordingly, on each side of the plate 10, said levers 37 and 39 may be so secured to the respective ends of a sleeve 41, Figs. 5 and 6, that the sleeve 41 and levers 37 and 39 move together as a unit. The member or shaft 36 passes within the sleeve 41, the head thereof engaging the lever 37 and its other end being suitably secured, as by peening, to the lever 39. The aforesaid lever system is suitably biased in a counter-clockwise direction, Fig. 3, for example, by a helical spring 42 secured at one end to the plate 10 and at its other end to a lug 39a extending from the pawl-actuated lever 39.

Suitably secured to the pawl-actuated lever 39 for coaction with the pawl 35, is a rack member 43 having at one end thereof an inclined upper edge 43a, Fig. 5. Carried by the lever 39 or rack 43, preferably the latter, is a member 44 preferably of stiff resilient material and having a hook-shaped end adapted to engage the member 34a of arm 34, as hereinafter more fully described. The end of lever 39 removed from the rack 43 has a roller or extension 45 projecting laterally therefrom for coaction with the cam 20, Figs. 3 and 6.

The clutch-actuated lever 37 comprises a hook-shaped end 37a, Fig. 5, adapted to periodically permit the clutch crescent 14 to bring its tooth 14a into meshing relation with the clutch spider 13.

Loosely mounted on the sleeve 41, preferably above the plate 10, is a lever 46, Figs. 3, 5 and 6, which, at its end, periodically engages the finger 34d of arm 34. Lever 46 is suitably biased toward a pin or member 47 upstanding from the plate 10, as by a helical spring 48 connected to said pin and to a lug 46a projecting from said lever 46, Fig. 5.

Referring to Figs. 2 and 8, the drive shaft 5 is shown as extending through an opening in the plate 10 and having a longitudinally extending channel 5a for the reception of a key comprised in the stem of the turntable B, as hereinafter more fully described. Encircling the shaft 5 and non-rotatably secured to the plate 10 is a bushing or sleeve 50, Fig. 8, on which a barrel cam 51 is disposed for free rotatable movement. The cam 51, on opposite sides thereof, comprises similar cam surfaces 51a of which one is clearly illustrated in Fig. 2. A gear 52, preferably formed integrally with cam 51, meshes with and is periodically driven by the gear 18, Fig. 3.

Coacting, respectively, with the cam surfaces 51a are cam followers or rollers 53, each carried by an arm 54, in turn carried by a sleeve 55 slidable within the aforesaid bushing 50. As illustrated in Fig. 2, the arms 54 and another arm 56, preferably, are formed integrally with each other, said arm 56 terminating in a fork shaped end or clevis embracing and being slidable along a standard, rod or member 57 upstanding from the member 10, whereby the cam followers 53 are restrained from rotative movement. The structure comprising the arms 54, 54 and 56 may be secured in any suitable manner to the sleeve 55 for movement therewith longitudinally of the shaft 5. In the example shown, the various arms aforesaid terminate in a section 58, Fig. 8, having a perforation in which is received a shouldered portion of the sleeve 55, a washer 59 being peened to one end of the sleeve 55 and to the section 58, said washer 59 uniting the sleeve 55 and arms 54, 54 and 56 so that they may move axially of the shaft 5, rotative movement thereof with respect to said shaft 5 being prevented by the control exercised by the member 57 upon the arm 56.

The washer 59 constitutes a shoulder or bearing surface for the turntable B, which, as illustrated in Figs. 1 and 8, comprises an outer layer or member 60 of felt or the like carried by a circular member 61 preferably of metallic sheet material, the latter being riveted or otherwise suitably secured to a turntable stem 62 from which a record-receiving pin 63 extends centrally through the members 61 and 60 and beyond the latter. The stem 62 comprises a flanged section or shoulder 64 and a sleeve-like extension 65 having a passage extending axially thereof and of a diameter somewhat greater than the diameter of the shaft 5, a pin 66 extending transversely of said passage for reception in the channel 5a of shaft 5, whereby rotatable movement is imparted to the turntable B even though it is movable vertically.

Ordinarily, a washer 67 engages the shoulder 64 while a similar washer 68, Fig. 8, engages the washer 59, a washer 69 being interposed between the washers 67 and 68 comprising anti-friction members 70.

When the members illustrated in Fig. 8 are disposed in assembled relation, sleeve 55 slidably fits within the bushing 50, the position of said sleeve 55 axially of the shaft 5 depending upon the regions wherein the cam followers 53 engage the respective cam surfaces 51a. When thus assembled, the shoulder 64 of stem 62 is spaced from the washer 59 only by the washers 68, 69 and 70, the sleeve-like extension 65 being disposed within the sleeve 55 and being freely slidable along the shaft 55, pin 66 falling within the channel 5a.

Referring particularly to Figs. 1, 2, 9 and 10, the record magazine P is illustrated as comprising a receptacle or well 71 circular in configuration and disposed in an opening of corresponding shape in the shelf 3, a flanged portion 71a of receptacle 71 engaging the top of said shelf 3 and being secured thereto by screws 72 or the like, Fig. 1. Disposed within the receptacle 71 is a plate-like record-supporting member 73 preferably provided with a felt surface 74 for engagement with the lowermost record of the stack of records. By preference, the member 73 is formed of sheet-like metallic material and, to decrease the weight thereof, it is desirable that a number of perforations 75 be formed therein. The member 73 and the thereon-supported stack of records should be biased from the bottom wall of the receptacle 71 by a force exceeding the combined weight of the member 73 and the greatest number of records that will be stacked thereon at any one time. As one example of such a biasing construction, said bottom wall has a plurality of leaf spring 76 secured thereto by bolts 77, or equivalent. The springs 76 should be symmetrically arranged on said bottom wall from which they project into contact with that surface of the member 73 opposite the felt surface 74. For restraining or limiting movement of the member 73 from the bottom wall of receptacle 71, there may be utilized a plurality of rods or members 78, each having one end fixed to the member 73 and freely passing through an opening in the bottom wall of receptacle 71 exteriorly of which each of said members 78 is provided with a stop member 79, whereby said member 73 is prevented from moving an excessive distance or from being disengaged from the bottom wall of the receptacle 71.

For all stack heights, the topmost record R of the stack of records should be disposed entirely above the upper surface of the flange 71a, Fig. 11. To this end, there may be utilized an arrangement such as illustrated in Fig. 1, wherein a bracket 80 is shown as suitably secured to the flange 71a or shelf 3 and having a projection 80a extending above the stack of records. Cooperating with the bracket 80 to properly position the topmost record R is a member 81 pivoted at 82 on a member extending through the flange 71a and into the shelf 3. Member 81 comprises a plurality of projections 81a also extending above the topmost record R and, if desired, said member 81 may also comprise an actuating member 81b.

To the end that the member 81 may be maintained in record-restraining position, there is provided a latching device which comprises a plurality of members 83 and 84, each secured to the flange 71a of receptacle 71. In the example shown, member 84 is an abutment rising above the upper surface of flange 71a a distance substantially the same as the thickness of a record R while the member 83 comprises a resilient portion 83a spaced from the flange 71a. When the member 81 is moved to record-restraining position, as illustrated by the full lines in Fig. 1, the end thereof is passed beneath the resilient portion 83a of member 83, the resilient portion 83a holding the end of member 81 in engagement with member 84 and maintaining said member 81 in the desired position. It shall be understood that the projections 80a, 81a and 81a are spaced above the flange 71a a distance corresponding substantially with the thickness of the record R whereby the topmost record R of the stack of records is, before removal from said stack, maintained substantially in the position illustrated in Fig. 11. If desired, pivotal movement of the member 81 may be limited by a projection 81c extending therefrom and into an opening of suitable size in the flange 71a, Figs. 1, 9 and 10.

Referring to Figs. 2 and 3, the crank arm 21 is shown as having pivoted thereto a link 85 connected to another link 86 by an adjustable pin-and-slot connection 87. The link 86 is pivoted to a crank arm 88 rotatable with a stud shaft 89 journaled in the shelf 3 through which said shaft extends and at its end above said shelf 3, Figs. 1 and 2, has the aforesaid record-translating member or arm T secured thereto for movement therewith.

The free end of arm T has a member 90 projecting therefrom and preferably so secured thereto that it may be adjusted longitudinally thereof. Rising from each side of the member 90 at one end thereof are ears 91 through which extends a pin 92 on which a record-engaging member 93 is pivoted. The member 93 comprises a curved end portion 93a, between which and a toe portion 94, the edge of a record is received, said toe portion comprising a threaded stem 94a passing through the member 93 and coacting with a nut 95 to maintain said toe portion 94 in the position illustrated by the full lines in Fig. 12, a washer 96 spacing the toe portion 94 the proper distance from the curved portion 93a and also forming a shoulder to be engaged by the edge of a record.

Referring to Fig. 1, a record R under control of the member T is moved from right to left along a path defined by members or strips 97 secured in fixed position in any desired manner as, for example, by screws 98 passing through portions of said members and threaded into the shelf 3 and cabinet wall 1.

As illustrated in Fig. 2, the sloping wall 4 merges into a horizontal wall 4a in the region of the cabinet below the turntable B, said wall 4a comprising an opening through which the member 58 and its arms 54, 54 and 56 are freely movable. Carried by and fixed to the wall 4a at one side of the turntable B is a member 99 having spaced ears in which is revolubly mounted a discoidal or spherical member 100 having an outer layer 101 of felt or rubber. At the other side of the turntable B, the wall 4a has secured thereto an upstanding member 102 terminating, preferably, in a tip 103 of hard rubber, or the like. Located substantially in the path taken by the center line of a record R as it moves from right to left, Figs. 1 and 2, and in a region occupied by its advanced edge when movement thereof under the control of the arm T ceases is a bracket 104 having a sloping face 105 preferably felt-covered.

Under some circumstances, for example, when the motor 6 is electrically operated, the wall 4a may have mounted thereon a switch 106 and a speed control device 107, the latter usually comprising a threaded member controlling a friction device associated with the motor governor.

The roller 100, tip 103 and the horizontal surface of bracket 104 are all positioned substantially the same distances above the wall 4a and without the periphery of the turntable B.

Upon completion of a period of sound reproduction, the record is discharged from the turntable B, as hereinafter described, and passes above the walls 4a and 4 and below the shelf 3 into the compartment C, Fig. 2. To facilitate passage of the record in this manner, it is desirable that anti-friction mechanism be disposed in its path such, for example, as the roller 108 supported by the bracket 109 carried by the wall 4.

The operation is as follows:

In general, any suitable number of records R may readily be placed in the magazine P after the member 81 has been moved from the position illustrated by the full lines of Fig. 1. The diameter of the receptacle 71 is slightly greater than the diameters of individual records, which, and their supporting plate 73, are biased upwardly by the springs 76, the topmost record contacting with the projections 80a, 81a and 81a of the respective record-positioning members 80 and 81.

Thereupon, the topmost record R of the stack of records is moved from right to left, Fig. 1, and comes upon the turntable B where it remains in horizontal position, after which the needle of the sound box S is brought into engagement with the outermost portion of the record spiral sound reproducing groove and, during a period of sound reproduction, advances toward the center of the record. Finally, upon completion of a period of sound reproduction, by a suitably exercised control, the turntable B is lowered and, as a result, the record is moved from left to right, Fig. 2, below the shelf 3 and above the walls 4a, 4 into the compartment C. As the turntable B is lowered, the tone arm A is swung from left to right, Fig. 1; meanwhile another record R is advanced from right to left, Fig. 1, and deposited upon the turntable B whereupon the above described operation is repeated.

More specifically, the operation is as follows:

With a record R on the turntable B, sound box S, under the control of the spiral sound reproducing groove on the record, moves from right to left, Fig. 1, and, upon completion of the period of sound reproduction, engages a groove e on the upper surface of the record R which is eccentrically disposed with respect to the record center and which communicates with the aforesaid spiral sound reproducing groove.

While the sound box S is moving from right to left as described immediately above, the tone arm A and its arm 34 partake of similar movement, the edged surface 35a of pawl 35 moving from right to left, Fig. 5, over the teeth of rack 43 with which said edged surface 35a freely slidably engages while the pawl 35 is moving in the direction last described. While thus moving, clutch-actuating lever 37 is holding the clutch crescent 14 in the position shown in Fig. 5 and, as a result, there is no movement of the disk 16.

When the needle associated with the sound box S passes into the record eccentric groove e, the sound box S, tone arm A and its arm 34 are almost immediately given slight reverse movement from left to right, Figs. 1 and 5, the pawl 35 moving therewith. Due to the fact that the teeth of rack 43 exercise a clutching effect on pawl 35 when the latter moves as last described, the aforesaid reverse movement of the tone arm A and its arm 34 causes slight oscillation of the levers 39 and 37 in a clockwise direction, Fig. 5, the lever 37 at its end 37a disengaging from the clutch crescent 14 and allowing the latter, under the influence of the spring 15, to engage the clutch spider 13 with its tooth 14a. As hereinbefore stated, the clutch spider 13 rotates with the constantly rotating gear 8 and, therefore, so long as the clutch crescent 14 remains free from the lever 37, rotation is effected of the shaft 9, gear 17, its meshing gear 18, and shaft 19. Gear 18 and shaft 19 control the various automatic functions of the herein described mechanism while the mechanism is "in cycle" which covers that period while the clutch crescent 14 is engaged with spider 13.

Before the cycle of the machine starts and during a period of sound reproduction, the turntable B rotates in the position illustrated in Fig. 2 with a record horizontally disposed thereon. This is due to the fact that at the end of the previous cycle of the automatic mechanism, the gear 52 and cam 51 stopped in such position that the cam rollers 53 engage the respective cam surfaces 51a at their top horizontal sections.

In response to rotation of gear 18, movement of gear 52 and cam 51 is initiated, the almost vertical portions of the cam surfaces 51a being brought into coacting relation with the cam followers 53. As a result, the turntable B abruptly descends, its stem 65 moving within the sleeve 55 as the latter moves downwardly, Fig. 8, and also moving exteriorly of the end of shaft 5.

As the turntable B moves downwardly, rotation thereof and the record thereon continues, the latter passing from the needle of sound box S due to the action of members 30a and 30b on the latter. Almost immediately, one edge of the record engages the tip 103 of post 102 and a substantially opposite edge thereof almost simultaneously engages the roller 100. As a result, the record pivots around the post 102 and, since it is rotating in a clockwise direction, Fig. 1, a motion of translation is imparted thereto from left to right, Figs. 1 and 2, and, as stated above it is passed, partly under the influence of gravity, into the compartment C over the roller 108.

Almost immediately after the turntable B has reached the limit of its downward movement, it starts to ascend under the influence of the gradually sloping parts of the cam surfaces 51a, one of which is shown in Fig. 2 at the left of cam 51. The ratio between the gears 18 and 52 is such that, upon completion of the cycle, cam 51 has completed one revolution only, its cam surfaces 51a having returned the sleeve 55 to the position illustrated in Fig. 2 and raised the constantly rotating turntable B to its maximum height where it stays until the trip mechanism is again actuated to cause the automatic mechanism to execute another cycle of operation.

As hereinbefore stated, the beginning of the cycle of the automatic mechanism initiates movement of shaft 19 to which the crank arm 21 is secured for movement therewith. As crank arm 21 rotates with respect to the axis of shaft 19, the record-translating member T moves clockwise from the position illustrated by the full lines in Fig. 1, initially, the edge of the topmost record R of the stack of records being received between the curved portion 93a of member 93 and the toe portion 94 carried thereby. During movement of member T, as aforesaid, said record R is moved from right to left, Fig. 1, until substantially in coincidence with the turntable B which at this time is moving upwardly therebeneath. As the record R comes above the area defined by the turntable B, opposite sides thereof engage and are supported by roller 100 and post 102, movement of said record R under the influence of member T continuing until its rear edge is barely supported by the curved extremity 111, Fig. 1, of shelf 3. After the record R has been passed to this position, the record-translating member T recedes and, upon completion of the cycle, again occupies the position illustrated by the full lines in Fig. 1.

The record R remains in the position last described for a fraction of a second, or more, whereupon the record-receiving pin 63 of turntable B enters the opening provided therefor in the record and gives said record slight renewed movement from left to right, Fig. 1, to center the same on the turntable B and to remove its rear edge from the shelf 3. Continued upward movement of the turntable B carries the record R above the roller 100 and past 102, the turntable B finally reaching its uppermost position, as hereinbefore described. Just before this position is reached, the stylus of the sound box S is engaged by the record and the latter is slightly elevated, the stop member 30b moving from the stop member 30a.

As the cycle of the mechanism was initiated, the cam 20 started moving in a clockwise direction from the position thereof illustrated in Figs. 3 and 6. During initial movement of cam 20, its cam surface coacts with cam follower 45 merely to retain levers 37 and 39 substantially in the position to which moved under the influence of pawl 35. Thereafter, the surface of cam 20 moves cam follower 45 to impart substantially clockwise movement to levers 37 and 39, Figs. 5 and 6.

As one result of the movement of levers 37 and 39 as last described, the hook-shaped end of member 44, which is carried by lever 39, engages the member 34a of arm 34 thereby swinging the tone arm A in a counter-clockwise direction, Fig. 1, to the position illustrated in Fig. 1 wherein the needle of the sound box S is so placed that it will occupy a position above a record R but slightly without the area defined by the sound reproducing spiral groove of said record when the latter arrives above the turntable B. Ordinarily, the aforesaid swinging movement of tone arm A occurs soon after descending movement of the turntable B is initiated or at any time after the record R has moved downwardly from the stylus of the sound box S.

As another result of the movement of levers 37 and 39 as last described, the end of ratchet 43 engages an angular extension of the lever 46 to swing said lever 46 in a clockwise direction, Fig. 5, thereby tensioning spring 48. Such swinging movement of lever 46 continues until roller 45 engages that portion of the cam 20 which is disposed concentrically with respect to hub 18a, whereupon lever 46 remains in the position to which swung until late in the cycle when cam follower 45 leaves the concentric position of cam 20 and nears the position illustrated in Fig. 6. At this time, the turntable B and a record R have been moved to fully elevated position. Lever 46, then, in swinging in a counter-clockwise direction, Fig. 5, under the influence of spring 48 engages, at its end, with the finger 34d of arm 34 to thereby swing the tone arm A in a clockwise direction, Fig. 1, and to gently move the needle of the sound box S into engagement with the outer end of the spiral sound reproducing groove on the record R. Such counter-clockwise movement of lever 46 continues until it engages the pin 47, Fig. 5.

As stated above, the tone arm A is positively actuated, first in a clockwise direction, Fig. 1, and then in a counter-clockwise direction, Fig. 1, and a given point thereon adjacent the connection 29 moves only in substantially a horizontal plane.

As cam 20 nears the position illustrated in Fig. 6, the levers 37 and 39 are swinging in a counter-clockwise direction, Figs. 5 and 6, and, as cam follower 45 reaches the deepest part of the groove of cam 20, the hook-shaped extension 37a of lever 37 moves into the path of the end of clutch crescent 14 which swings in a clockwise direction, Fig. 5, tensioning the spring 15 and withdrawing the tooth 14a from clutch spider 13. In this manner, the cycle of the automatic mechanism is concluded.

As the cycle of operation ceases, the pin 26 comes within the recess defined by the shoulder 24a of lever 24 whereby the various parts are releasably locked in position during the period that ensues while the machine is out of cycle.

Upon completion of the cycle of operation, movement of gear 18 and shaft 19 ceases and, during a period of sound reproduction, the record-translating arm T occupies a position illustrated by the full lines in Fig. 1, while the turntable B with a record R thereon rotates in the position illustrated in Fig. 2. Meanwhile, the tone arm A, its arm 34, and sound box S are moving in a clockwise direction, Fig. 1, under the driving influence of the record spiral sound reproducing groove and the pawl 35 is moving from right to left, Fig. 5. Eventually, reverse movement is imparted to said tone arm A, its arm 34 and pawl 35 whereupon another cycle of operation is initiated during which the various parts function as hereinbefore described.

After a number of automatic operations, as aforesaid, the compartment C contains a plurality of records disposed in stacked relation. The compartment C is bounded by the wall 4, shelf 3, a casing side wall 2, and the front and rear casing walls 1, 1. The records may be removed from said compartment C in any suitable manner preferably, however, through an opening provided in the front wall of the casing.

Referring to Figs. 13, 14, 15 and 16, there is illustrated another form of mechanism having the general function of lowering and elevating the record turntable, and controlling the cycle of the machine. Such mechanism may advantageously be associated with a cabinet, record-supply receptacle, record-translating member and tone arm structure of the character hereinbefore described and is illustrated and described in that relation. As shown, there is utilized a supporting plate or member 115, corresponding generally with the hereinbefore described plate 10 which extends transversely of the casing and is suitably supported by its front and rear walls. A drive shaft 116, Fig. 16, connected to any suitable motive device extends through an opening in the plate 115 and comprises an axial channel 116a and a worm 116b. Although shown in dis-assembled relation in Fig. 16, it shall be understood that the shaft 116 is so mounted in bearings, not shown, that its upper end terminates some distance above the plate 115.

Extending through the opening formed in the plate 115 for shaft 116 is a hollow cylindrical member 117 having a skirt portion extending well below the plate 115 to which said member 117 is non-rotatably secured. As illustrated, the aforesaid skirt portion of member 117 comprises diametrically alined slots 117a utilizable as hereinafter described. Slidable within the member 117 is a second hollow cylindrical member 118 comprising, at its upper end, a flanged portion 118a serving to limit downward movement of said member 118. Extending laterally from diametrical opposite sides of the member 118 are pins or projections 118b each freely slidable within a slot 117a. Slidable within the member 118 is the sleeve-like extension 65 of the turntable stem 62, the pin 66 carried by said extension 65 coacting with one of the walls of channel 116a, of shaft 116 to impart rotatable movement to the turntable B independently of the position of the latter. It is desirable that there be interposed between the flanged shoulder of the stem 62 and the flanged extremity 118a of member 118 the washers 67, 68 and 69, the latter preferably embodying anti-friction members as shown in Fig. 8.

Worm 116b of shaft 116 meshes with and drives a worm wheel 119 freely rotatable on a shaft 120 mounted in bearings depending from the plate 115. A sleeve 121 is rotatably mounted on the shaft 120 and to one end of this sleeve is secured the aforesaid worm wheel 119 while to the other end of said sleeve a clutch wheel or spider 122 is secured. Accordingly, worm wheel 119, sleeve 121 and clutch spider 122 move together as a unit.

Beyond the clutch wheel 122, shaft 120 carries a second sleeve 123 to which a cam 124 is secured. At its end, removed from the cam 124, shaft 120 carries a third sleeve or collar 125 to which a cam 126 is secured.

The sleeves 123 and 125 are keyed or otherwise suitably locked to the shaft 120 so as to rotate therewith. Accordingly, shaft 120, sleeve 123, cam 124, sleeve 125 and cam 126 move together as a unit.

Pivoted at 127 to a member 128 depending from the plate 115 is a member 129 having a saddle portion 129a from which the spaced arms 129b extend, the latter being disposed beneath the pins 118b, Figs. 13 and 16. A pin 130, Figs. 13 and 14, coacts with the cam 126.

The face of the cam 124 nearest the clutch wheel 122 comprises a section of plane sheet material to which at 131 is pivoted a clutch crescent 132 having a tooth 132a for coaction with the clutch wheel 122. Clutch crescent 132 is biased for movement in a clockwise direction, Fig. 15, by a helical spring 133 secured at one end to a pin 134 projecting from the clutch crescent 132 and at its other end to a pin 135 projecting from the face of cam 124.

Pin 135, outwardly of the spring 133, comprises a portion for coaction with a lever 136 pivoted to a member 137 depending from the plate 115. Lever 136 is biased in a counter-clockwise direction, Fig. 14, by a helical spring 137a secured to said lever and to the plate 115.

Secured to and rotatable with the shaft 120 is a crank arm 138, Fig. 14, to which is pivoted a link 139 connected to a record-translating member, not shown, but which corresponds preferably with the member T shown in Figs. 1, 2 and 3.

The arm 34 of the tone arm A comprises an angular extension 34e, Fig. 14, extending in the example shown, substantially horizontally and comprising an upwardly extending pin 140 and a depending pin 141.

Pivoted to the extension 34e is a pawl 142 for coaction with a rack 143 carried by a clutch-actuating lever 144 pivoted to the member 115 at 145 and biased in a counter-clockwise direction, Fig. 14, toward a stop 146 by a helical spring 147, or the like. The lever 144 comprises a nose 144a for coaction with the clutch crescent 132, and a member 148 for coaction with the cam 124.

Pivoted at 149 to the member 115 is a lever 150 biased in a counter-clockwise direction, Fig. 14, by a helical spring 151, or the like. The lever 150 comprises a nose 150a for coaction with the lever 144 and its free end periodically coacts with the pin 140.

The operation of the mechanism illustrated in Figs. 13, 14, 15 and 16 is as follows:

During a period of sound reproduction the turntable B occupies the position illustrated by the broken lines in Fig. 13, the record thereon rotating therewith and coacting with the sound box needle. At this time, the mechanism is out of cycle, the lever 144 being in the position illustrated in Figs. 14 and 15 and, therefore, holding tooth 132a of clutch crescent 132 from engagement with the clutch wheel 122. Accordingly, although said clutch wheel 122, sleeve 121, and worm wheel 119 are rotating under the influence of worm 116b, no motion is imparted to the cams 124 and 126 or to the crank arm 138. Since the turntable B is in its highest position, when the mechanism is thus out of cycle, cam 126 remains stationary, not in the position illustrated in Fig. 13, but in such position that the highest part thereof coacts with the pin 130.

During the period of sound reproduction, the sound box S moves toward the center of the turntable B, the pawl 142 moving from right to left, Fig. 14, over the rack 143. At the conclusion of the period of sound reproduction, the sound box passes into the record eccentric groove e and, as a result, slight reverse movement from left to right, Fig. 14, is imparted to the pawl 142. Due to this action, lever 144 is swung in a clockwise direction, Fig. 14, and its nose 144a is withdrawn from the clutch crescent 132 allowing the tooth 132a of the latter to pass into the space between two of the teeth on the constantly rotating clutch wheel 122. The automatic mechanism is now in cycle.

In response to the action last described, cam 124, sleeve 123 and shaft 120 are coupled to the clutch wheel 122.

Cam 126 moves with shaft 120 and, therefore, almost immediately upon the initiation of the cycle, pin 130 passes to the low part of said cam. When the pin 130 is thus actuated, member 129 is swung counter-clockwise, Fig. 13, about its pivot 127, and the pins 118b, member 118 and the turntable B abruptly descend, the record thereon engaging the tip 103 of post 102 and roller 100 with resultant discharge thereof into the compartment C.

Almost immediately after the turntable B has reached the limit of its downward movement, it starts to ascend under the influence of the cam 126, said turntable B eventually reaching its maximum height where it remains until the trip mechanism is again actuated to cause the automatic mechanism to execute another cycle of operation.

The crank arm 138 is secured to shaft 120 for movement therewith. Accordingly, when the cycle begins, the record-translating member T moves in one direction and then in reverse direction above the shelf 3 to transport a record R above the turntable B and to return to its original position. This action is the same as that described above in connection with Figs. 1–12 and also as described, the turntable B removes the record from the roller 100, past 102 and the curved extremity 111 of shelf 3 and carries it upwardly to the region wherein sound reproduction is effected.

As the cycle was initiated, the cam 124 started rotating in a clockwise direction, Fig. 15. As a result, lever 144 is swung in a clockwise direction, Fig. 14, its angular extension engaging the pin 141 to swing the tone arm A to such position that the needle of sound box S is so placed that it will occupy a position above and slightly without the area defined by the sound reproducing spiral groove of a record R when the latter arrives above the turntable B. Lever 150 moves clockwise with the leevr 144, when the latter moves as described above.

Late in the cycle, as cam 124 permits lever 144 to approach the position illustrated in Fig. 14, the end of lever 150 engages the pin 140 and, under the influence of spring 151, the needle of the sound box is moved gently into engagement with the outer end of the record spiral groove.

Continued movement of the cam 124 in a clockwise direction, Fig. 15, permits the lever 144 to return to the position illustrated in Fig. 14, the clutch crescent 132 engaging the nose 144a of lever 144 with resultant detachment of tooth 132a from the clutch spider 122. As the cycle ceases, the end of pin 135 comes with the recess formed by the end of lever 136 to releasably lock the various parts while the machine is out of cycle.

Upon completion of the cycle of operation, movement of cam 124, sleeve 123 and shaft 120 is discontinued and these, together with the mechanism controlled thereby, remain stationary during a period of sound reproduction and until another cycle of operation is initiated.

Although the machine or mechanism constructed as herein disclosed is intended particularly for records wherein the spiral sound reproducing groove terminates in a circular groove eccentrically disposed with respect to the record center, it shall be understood that my invention is not to be thus limited. Under some circumstances, it may be desirable to successively initiate cycles of operation of the automatic mechanism otherwise than by a control performed by the eccentric grooves on the respective records. Thus, for example, the control may be effected by the "Crowell" type of groove which comprises generally a large pitch spiral groove extending from the spiral sound reproducing groove and terminating in a circular groove concentrically disposed with respect to the record center.

It shall also be understood that in no manner at all is my invention to be limited to the utilization of an acoustical or mechanical type of sound box wherein sound waves originated by the sound box diaphragm are transmitted through a tone arm or taper tube and thence to an amplifying horn. In lieu of a sound box, as aforesaid, any desired type of a pick-up may be utilized, such a pick-up, as well understood in the art, generating or modifying an electrical current in response to the actuation of an armature, or equivalent, by the talking machine or phonograph records, the aforesaid electrical current operating a loud speaker, or equivalent, disposed either in the same casing containing the automatic mechanism or in a casing separate therefrom, as desired.

An important feature or advantage of the hereinbefore described system or arrangement for manipulating talking machine or phonograph records resides in the provision of a reciprocatory turntable for successively elevating records to and removing them from a sound reproducing position while said records are disposed horizontally. By virtue of this arrangement, lateral movement of the sound box, or equivalent, and its tone arm, or equivalent, from a position above and adjacent the center of the turntable is effected in such manner that a given point thereon moves only in a horizontal plane, excluding, of course, the movement of the sound box, or equivalent, early and late in each cycle when it leaves and is engaged by a record support on the descending and rising turntable.

Although but a single motive device has been herein illustrated and described for jointly operating the turntable and the automatic mechanism it shall be understood, if desired, that a plurality of motive devices may be utilized, one to operate the turntable and another to operate the automatic mechanism, the eccentric groove or other control connecting said automatic mechanism to its motive device at the proper times to effect the series of automatic operations.

What I claim is:

1. The method of manipulating talking machine or phonograph records, which comprises elevating a horizontally disposed record into engagement with a sound reproducing instrumentality, moving said instrumentality in one direction laterally of said record and into engagement with its spiral sound reproducing groove, removing said record from said instrumentality after a period of sound reproduction and imparting to said record a motion of translation under the influence of energy derived from its rotary motion, and moving said instrumentality in a direction substantially the reverse of said one direction and with a given point thereon travelling only in substantially a horizontal plane.

2. The method of manipulating talking machine or phonograph records, which comprises elevating a horizontally disposed record into engagement with a sound reproducing instrumentality, moving said instrumentality in one direction laterally of said record and into engagement with its spiral sound reproducing groove, lowering said record from said instrumentality after a period of sound reproduction and imparting to said record a motion of translation under the influence of energy derived from its rotary motion, and moving said instrumentality in a direction substantially the reverse of said one direction and with a given point thereon travelling only in substantially a horizontal plane.

3. The method of manipulating talking machine or phonograph records, which comprises transporting a record along a path extending from a stack of records contacting and supported one with and by another, elevating a horizontally disposed record into engagement with a sound reproducing instrumentality, moving said instrumentality in one direction laterally of said record and into engagement with its spiral sound reproducing groove, removing said record from said instrumentality after a period of sound reproduction and imparting to said record a motion of translation under the influence of energy derived from its rotary motion, and moving said instrumentality in a direction substantially the reverse of said one direction and with a given point thereon travelling only in substantially a horizontal plane.

4. The method of manipulating talking machine or phonograph records, which comprises disposing a plurality of records in or on a supporting structure, transporting said records in succession from said supporting structure and along a path, successively elevating said records while horizontally disposed into engagement with a sound reproducing instrumentality, successively moving said instrumentality in one direction laterally of each record and into engagement with its spiral sound reproducing groove, removing said records in succession from said instrumentality after the respective periods of sound reproduction and successively imparting to said records a motion of translation under the influence of energy derived from their rotary motion, and successively moving said instrumentality in a direction substantially the reverse of said one direction and with a given point thereon travelling only in substantially a horizontal plane.

5. The method of manipulating talking machine or phonograph records, which comprises removing in succession the respective records defining one end of a group of superposed records and transporting them along a path, successively elevating said records while horizontally disposed into engagement with a sound reproducing instrumentality, successively moving said instrumentality in one direction laterally of each record and into engagement with its spiral sound reproducing groove, removing said records in succession from said instrumentality after the respective periods of sound reproduction and successively imparting to said records a motion of translation under the influence of energy derived from their rotary motion, and successively moving said instrumentality in a direction substantially the reverse of said one direction and with a given point thereon travelling only in substantially a horizontal plane.

6. The combination with a turntable having a talking machine or phonograph record horizontally disposed thereon, and means for moving said turntable in opposite directions along a path leading to a sound reproducing position, of a sound reproducing instrumentality in said position, means effective after said record has been moved to said position for moving said instrumentality in one direction laterally of said record and into engagement with its spiral sound reproducing groove, means for removing said record from said instrumentality after a period of sound reproduction and for imparting to said record a motion of translation under the influence of energy derived from its rotary motion, and means for moving said instrumentality in a direction substantially the reverse of said one direction and with a given point thereon travelling only in substantially a horizontal plane.

7. The combination with a turntable having a talking machine or phonograph record horizontally disposed thereon, and means for elevating and lowering said turntable along a path leading to a sound reproducing position, of a sound reproducing instrumentality in said position, means effective after said record has been moved to said position for moving said instrumentality in one direction laterally of said record and into engagement with its spiral sound reproducing groove, means for lowering said record from said instrumentality after a period of sound reproduction and for imparting to said record a motion of translation under the influence of energy derived from its rotary motion, and means for moving said instrumentality in a direction substantially the reverse of said one direction and with a given point thereon travelling only in substantially a horizontal plane.

8. The combination with a horizontal turntable, and means for moving said turntable in opposite directions along a path leading to a sound reproducing position, of a supporting structure for a stack of talking machine or phonograph records contacting and supported one with and by another, means for transporting a record from said stack of records and into said path for movement to said position, a sound reproducing instrumentality in said position, means effective after said record has been moved to said position for moving said instrumentality in one direction laterally of said record and into engagement with its spiral sound reproducing groove, means for removing said record from said instrumentality after a period of sound reproduction and for imparting to said record a motion of translation under the influence of energy derived from its rotary motion, and means for moving said instrumentality in a direction substantially the reverse of said one direction and with a given point thereon travelling only in substantially a horizontal plane.

9. The combination with a horizontal turntable, and means for moving said turntable in opposite directions along a path leading to a sound reproducing position, of a supporting structure for a plurality of talking machine or phonograph records, means for transporting said records in succession from said supporting structure and into said path for successive movement of said records to said position, a sound reproducing instrumentality in said position, means for successively moving said instrumentality in one direction laterally of the respective records to initiate the respective periods of sound reproduction, means for successively removing said records from said instrumentality after the respective periods of sound reproduction and for successively imparting to said records a motion of translation under the influence of energy derived from their rotary motion, and means effective after each record has been moved from said position for moving said instrumentality in a direction substantially the reverse of said one direction and with a given point thereon travelling only in substantially a horizontal plane.

10. The combination with a horizontal turntable, and means for moving said turntable in opposite directions along a path leading to a sound reproducing position, of a supporting structure for a group of superposed talking machine or phonograph records, means for successively removing the respective records defining one end of said group of records and for transporting them in succession into said path for successive movement thereof to said position, a sound reproducing instrumentality in said position, means for successively moving said instrumentality in one direction laterally of the respective records to initiate the respective periods of sound reproduction, means for successively removing said records from said instrumentality after the respective periods of sound reproduction and for successively imparting to said records a motion of translation under the influence of energy derived from their rotary motion, and means effective after each record has been moved from said position for moving said instrumentality in a direction substantially the reverse of said one direction and with a given point thereon travelling only in substantially a horizontal plane.

11. In combination, a turntable, means comprising a rotatable cam having a plurality of similar surfaces and cam follower means engaging said plurality of surfaces for periodically elevating said turntable to a sound reproducing position, means timed with said first named means for successively transporting talking machine or phonograph records into the path of said turntable, means for reproducing sound from each record while in said position, and means for successively removing said records from said turntable.

12. In combination, a turntable, means for periodically elevating said turntable to a sound reproducing position, said means comprising a rotatable cam having a plurality of similar surfaces and reciprocatory cam follower structure having members coacting, respectively, with said surfaces, means timed with said first named means for successively transporting talking machine or phonograph records into the path of said turntable, means for reproducing sound from each record while in said position, and means for successively removing said records from said turntable.

13. Mechanism for periodically elevating and lowering a talking machine or phonograph turntable comprising a drive shaft, a turntable having a sleeve receiving said shaft and splined thereto, a periodically rotated cam, and reciprocatory cam follower structure controlled by said cam, said structure engaging said sleeve and controlling movement of said turntable.

14. Mechanism for periodically elevating and lowering a talking machine or phonograph turntable comprising a drive shaft, a turntable having a sleeve receiving said shaft and splined thereto, a periodically rotated cam having a plurality of surfaces, and reciprocatory cam follower structure engaging said sleeve and comprising members coacting, respectively, with said surfaces and controlled by said cam for controlling movement of said turntable.

15. Mechanism for periodically elevating and lowering a talking machine turntable comprising a rotatable cam, a shaft passing through said cam, a turntable having a splined connection with said shaft, and non-rotatable means interposed between said turntable and said cam to move said turntable vertically as the cam rotates.

16. Mechanism for periodically elevating and lowering a talking machine turntable, comprising a rotatable cam having a plurality of similar cam surfaces formed thereon, a non-rotatable support having means engaging each of said plurality of cam surfaces, a drive shaft passing freely through said cam and support, and a turntable having a splined connection with said shaft and carried by said support.

17. Mechanism for periodically elevating and lowering a talking machine turntable comprising a rotatable cam, a support engaging said cam, means for preventing rotation of said support, a drive shaft passing freely through said cam and support, and a turntable connected with said shaft for rotation, and rotatably mounted on said support.

18. Mechanism for periodically elevating and lowering a talking machine turntable comprising a rotatable cam, a support engaging said cam, means for preventing rotation of said support, a drive shaft passing freely through said cam and support, a turntable rotatably mounted on said support and having a splined connection with said shaft, and an anti-friction bearing between said support and turntable.

HERMAN HOLLERITH, Jr.